United States Patent
Bennett et al.

(10) Patent No.: US 8,599,525 B2
(45) Date of Patent: Dec. 3, 2013

(54) ESD PROTECTION ON HIGH IMPEDANCE MIC INPUT

(75) Inventors: Christopher A. Bennett, Topsham, ME (US); Kenneth P. Snowdon, Falmouth, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 241 days.

(21) Appl. No.: 13/103,514

(22) Filed: May 9, 2011

(65) Prior Publication Data

US 2012/0287538 A1 Nov. 15, 2012

(51) Int. Cl.
*H02H 9/00* (2006.01)
(52) U.S. Cl.
USPC .......................................................... 361/56
(58) Field of Classification Search
USPC .......................................................... 361/56
See application file for complete search history.

(56) References Cited

U.S. PATENT DOCUMENTS

| 6,812,788 | B2 * | 11/2004 | Kern ................................ 330/69 |
| 2004/0142527 | A1 * | 7/2004 | Chen ............................. 438/238 |
| 2005/0151589 | A1 * | 7/2005 | Fallesen ......................... 330/259 |
| 2012/0043974 | A1 * | 2/2012 | van den Boom et al. ..... 324/658 |

FOREIGN PATENT DOCUMENTS

CN 102780214 A 11/2012
KR 1020120125960 A 11/2012

OTHER PUBLICATIONS

"Chinese Application Serial No. 201220206233.3, Office Action mailed Sep. 10, 2012", 3 pgs.
"Chinese Application Serial No. 201220206233.3, Response filed Nov. 6, 2012 to Office Action mailed Sep. 10, 2012", 30 pgs.

* cited by examiner

*Primary Examiner* — Scott Bauer
(74) *Attorney, Agent, or Firm* — Schwegman Lundberg Woessner P.A.

(57) ABSTRACT

An apparatus comprises an integrated circuit (IC) including an external IC connection, a high impedance circuit, a biasing circuit communicatively coupled to the external IC connection via the high impedance circuit, and an electro-static discharge (ESD) protection circuit coupled to the biasing circuit to form a circuit shunt path leading from the IC external connection to the ESD protection circuit via the high impedance circuit.

20 Claims, 4 Drawing Sheets

ESD PROTECTION ON HIGH IMPEDANCE MIC INPUT

BACKGROUND

An integrated circuit (IC) can receive electrical signals from off chip electronics. Protection from electrostatic discharge (ESD) is a concern for integrated circuits where a large capacitor circuit is not available to absorb current from an ESD event. Typically, input and output connections of an IC include a circuit to prevent damage to an IC from an ESD event by diverting ESD to ground. However, ESD protection can complicate the design of highly sensitive input and output connections.

OVERVIEW

This document relates generally to providing ESD protection to ICs, and in particular to providing ESD protection to input and outputs of the IC that have specific impedance requirements.

An apparatus example includes an IC having an external IC connection, a high impedance circuit, a biasing circuit communicatively coupled to the external IC connection via the high impedance circuit, and an ESD protection circuit coupled to the biasing circuit to form a circuit shunt path leading from the IC external connection to the ESD protection circuit via the high impedance circuit.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An input for a microphone connection is an example of an external IC connection that has specific impedance requirements. Because a microphone is essentially a capacitive device, an IC input to receive a microphone signal needs to be a high impedance input. Any ESD protection to such an input should not change the impedance profile of the input, such as by adding capacitance to the pin for example. This can be problematic because ESD protection circuits often use a resistor-capacitor (RC) trigger that adds capacitance to an input pin. Because of the special requirements of the input for a microphone, IC manufacturers often don't include ESD circuit protection on these sensitive inputs. Instead, ESD protection is provided through packaging, such as by placing a microphone and the IC together in an ESD protective metal canister or can.

Figure 1:
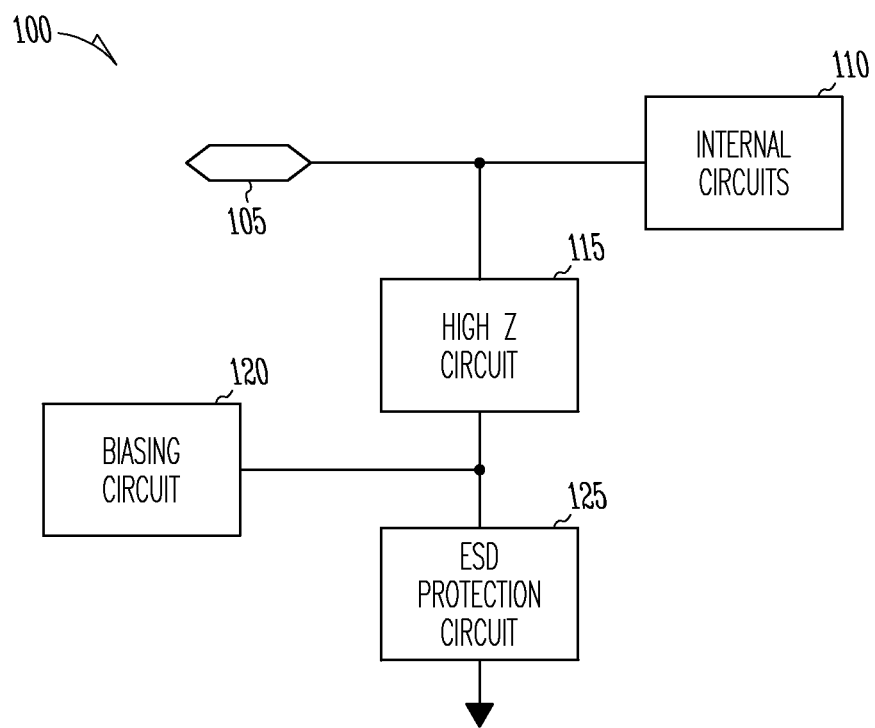
FIG. 1 is a block diagram of portions of an example of an IC.

FIG. 1 is a block diagram of portions of an example of an IC 100. The IC 100 includes an external IC connection 105 to internal IC circuits 110, a high impedance circuit 115, and a biasing circuit 120 communicatively coupled to the external IC connection 105 via the high impedance circuit 115. The IC also includes an ESD protection circuit 125 coupled to the biasing circuit 120 to form a circuit shunt path leading from the IC external connection 105 to the ESD protection circuit 125 via the high impedance circuit 115.

Figure 2:
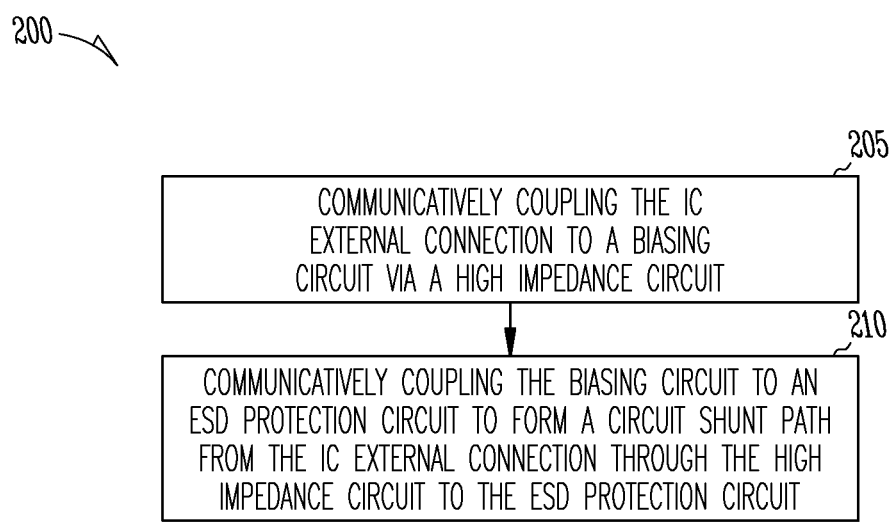
FIG. 2 is a flow diagram of an example of a method of providing ESD protection to a circuit.

FIG. 2 is a flow diagram of an example of a method 200 of providing ESD protection to an IC external connection. At block 205, the IC external connection is communicatively coupled to a biasing circuit via a high impedance circuit. The communicative coupling allows signal to be communicated between the external connection and the biasing circuit even though there may be intervening circuitry (e.g., in this case the high impedance circuit).

At block 210, the biasing circuit is communicatively coupled to an ESD protection circuit to form a circuit shunt path (e.g., to ground) from the IC external connection through the high impedance circuit to the ESD protection circuit.

Figure 3:
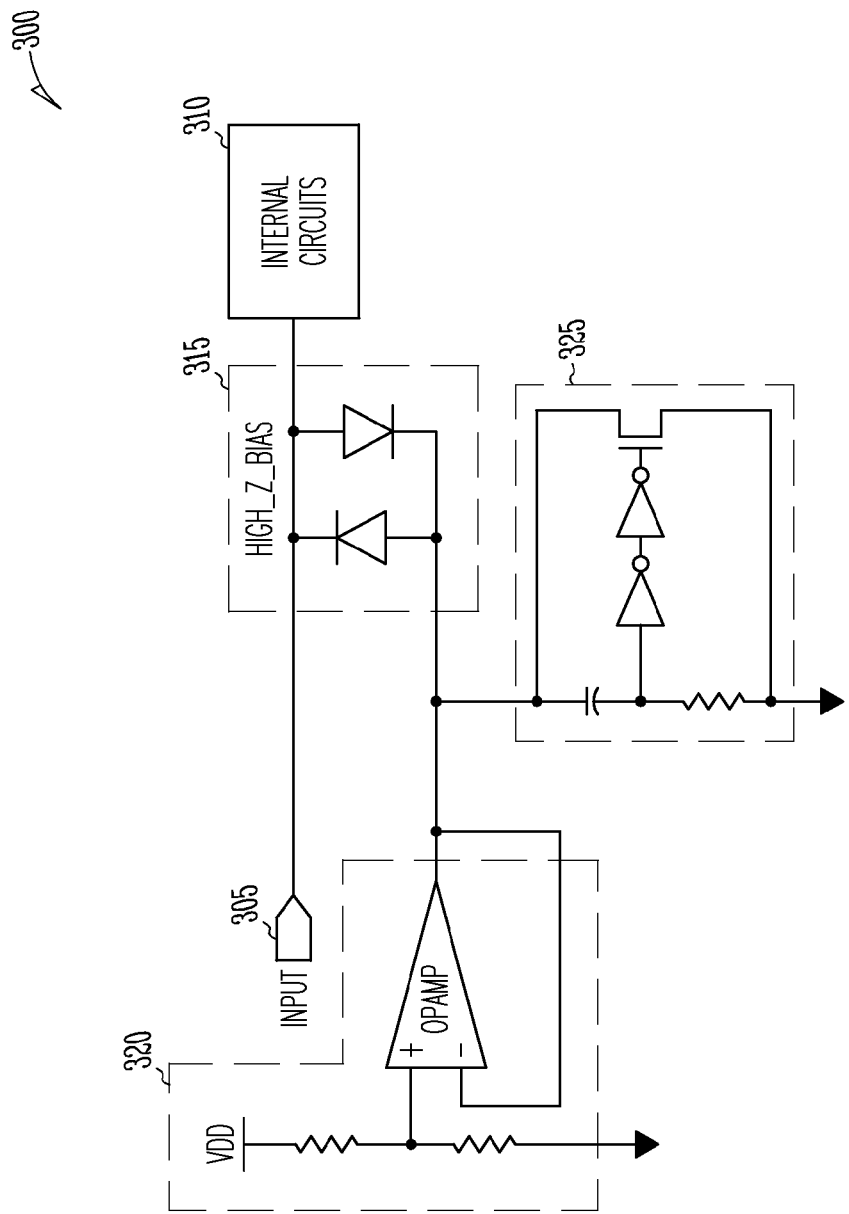
FIG. 3 is a block diagram of portions of another example of an IC.

FIG. 3 is a block diagram of portions of another example of an IC 300. In the Figure, the external IC connection is an input connection 305 to receive an electrical input signal, such as an input connection to receive an input signal from a microphone (e.g., a MIC input). The biasing circuit 320 includes a common mode biasing circuit configured to bias the received electrical input signal to a common mode voltage. Because a microphone is a capacitive device (e.g., less than one picofarad), the connection is AC coupled. The signal input from the microphone changes about the baseline provided by the common mode voltage. The common mode voltage can be set using a voltage divider.

The biasing circuit 320 includes an output coupled to the external IC connection through the high impedance circuit 315. The Figure also shows an example of an ESD protection circuit 325 that consists of an RC trigger. The RC time constant of the circuit is sized to respond to a rapid rise in voltage on the input (e.g., to pass an increase in voltage having a time constant of nanoseconds). It can be seen from the Figure that electrically connecting the RC trigger directly to the input connection 305 would add capacitance to the input and change the microphone signal. This change in impedance is avoided by electrically connecting the ESD protection circuit 325 to the biasing circuit 320 and connecting the biasing circuit 320 to the input connection through the high impedance circuit 315.

The high impedance circuit 315 ensures that the charge on the capacitance of the microphone isn't merely bled off by one or both of the biasing circuit 320 and the ESD protection circuit 325. Additionally, because the ESD protection circuit 325 is not directly connected to the input connection, the ESD protection circuit 325 does not contribute offset to the input due to leakage to circuit ground. In some examples, the resistance of the high impedance circuit is greater than one gigaohm (GΩ). In some examples, the high impedance circuit 315 includes a diode circuit configured to conduct current, due to an ESD event at the IC external connection, to the ESD protection circuit 325. The diode or diodes in the high impedance circuit 315 conduct ESD current to the common mode voltage node. The ESD protection circuit 325 will conduct and protect internal circuits 310 of the IC.

Figure 4:
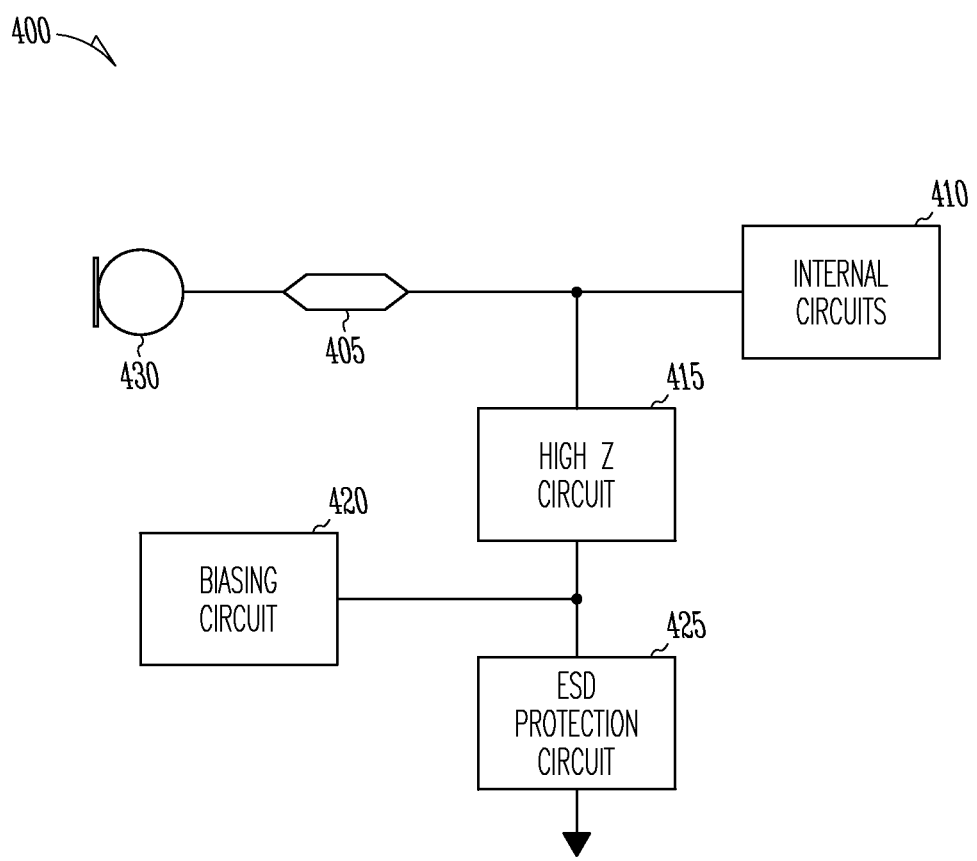
FIG. 4 is a block diagram of portions of an example of a system.

FIG. 4 is a block diagram of portions of an example of an electronic system 400. The system 400 includes a microphone circuit 430 and an IC. The IC includes an external IC connection 405 communicatively coupled to the microphone circuit 430, a high impedance circuit 415, a biasing circuit 420 communicatively coupled to the external IC connection 405 via the high impedance circuit 415, and an ESD protection circuit 425. The ESD protection circuit 425 is coupled to the biasing circuit 420 to form a circuit shunt path leading from the IC external connection to the ESD protection circuit via the high impedance circuit.

The microphone circuit 430 can be capacitively coupled to the external IC connection 405. In some examples, the capacitance at the external IC connection 405 is less than one pico-farad. In some examples, the biasing circuit 420 includes a common mode biasing circuit having an output coupled to the external IC connection 405 through the high impedance circuit 415. In some examples, the system 400 is included in a voice recording device. In some examples, the system 400 is included in a cellular phone.

Providing ESD protection internal to the IC can lead to more robust system design and can reduce system size by eliminating special packaging used for ESD protection.

Additional Notes

Example 1 includes subject matter (such as an apparatus or integrated circuit) comprising an external IC connection, a high impedance circuit, a biasing circuit communicatively coupled to the external IC connection via the high impedance circuit, and an electro-static discharge (ESD) protection circuit coupled to the biasing circuit to form a circuit shunt path. The circuit shunt path leads from the IC external connection to the ESD protection circuit via the high impedance circuit.

In Example 2, the subject matter of Example 1 can optionally include an external IC connection that can be an input connection to receive an electrical input signal. The biasing circuit can optionally include a common mode biasing circuit configured to bias the received electrical input signal to a common mode voltage, and wherein the biasing circuit includes an output coupled to the external IC connection through the high impedance circuit.

In Example 3, the subject matter of one or any combination of Examples 1 and 2 can optionally include a high impedance circuit with a resistance greater than one giga-ohm (1 GΩ).

In Example 4, the subject matter of one or any combination of Examples 1-3 can optionally include an external IC connection having a capacitance of less than one pico-farad (1 pF).

In Example 5, the subject matter of one or any combination of Examples 1-4 can optionally include a high impedance circuit that can include a diode circuit configured to conduct current, due to an ESD event at the IC external connection, to the ESD protection circuit.

Example 6 can include subject matter, or can be combined with the subject matter of one or any combination of Examples 1-5 to include subject matter (such as a system) comprising a microphone circuit and an IC. The IC can include an external IC connection communicatively coupled to the microphone circuit, a high impedance circuit, a biasing circuit communicatively coupled to the external IC connection via the high impedance circuit, and an ESD protection circuit coupled to the biasing circuit to form a circuit shunt path leading from the IC external connection to the ESD protection circuit via the high impedance circuit.

In Example 7, the subject matter of Example 6 can optionally include a biasing circuit that can include a common mode biasing circuit having an output coupled to the external IC connection through the high impedance circuit.

In Example 8, the subject matter of one or any combination of Examples 6 and 7 can optionally include a microphone circuit that can be capacitively coupled to the external IC connection.

In Example 9, the subject matter of one or any combination of Examples 6-8 can optionally include an external IC connection that can have a capacitance of less than one pico-farad.

In Example 10, the subject matter of one or any combination of Examples 6-9 can optionally a high impedance circuit that can have a resistance greater than one giga-ohm.

In Example 11, the subject matter of one or any combination of Examples 6-10 can optionally include a high impedance circuit that can include a diode circuit configured to conduct current due to an ESD event at the external IC connection to the ESD protection circuit.

In Example 12, the subject matter of one or any combination of Examples 6-11 can optionally include a system that can be included in a cellular phone.

In Example 13, the subject matter of one or any combination of Examples 6-12 can optionally include a system that can be included in a voice recording device.

Example 14 can include subject matter, or can be combined with the subject matter of one or any combination of Examples 1-13 to include subject matter (such as a method, a means for performing acts, or a machine-readable medium including instructions that, when performed by the machine, cause the machine to perform acts) comprising communicatively coupling the IC external connection to a biasing circuit via a high impedance circuit, and communicatively coupling the biasing circuit to an ESD protection circuit to form a circuit shunt path from the IC external connection through the high impedance circuit to the ESD protection circuit.

Such subject matter can include a means for communicatively coupling the IC external connection to a biasing circuit, such as by IC metal interconnect extending from an I/O pin to a biasing circuit internal to the IC. Such subject matter can include a means for communicatively coupling the biasing circuit to an ESD protection circuit to form a circuit shunt path, such as IC interconnect or devices internal to the IC.

In Example 15, the subject matter of claim 14 can optionally include communicatively coupling the IC external connection to an output of a common mode biasing circuit.

In Example 16, the subject matter of one or any combination of Examples 14 and 15 can optionally include capacitively coupling the IC external connection to a second device to communicate an electrical signal with the second device. Such subject matter can include a means for the capacitive coupling, such as a capacitor internal to the second device or a capacitive circuit I/O circuit of the IC.

In Example 17, the subject matter of one or any combination of Examples 14-16 can optionally include providing an alternating current (AC) coupling to the external connection from a microphone to receive an electrical microphone signal.

In Example 18, the subject matter of one or any combination of Examples 14-17 can include coupling the IC external connection to a circuit having an impedance greater than one giga-ohm.

In Example 19, the subject matter of one or any combination of Examples 14-18 can optionally include coupling the IC external connection to a high impedance circuit that includes a diode to conduct current from an ESD event to the ESD protection circuit.

Example 20 can include subject matter, or can be combined with the subject matter of one or any combination of Examples 1-5 to include subject matter (such as an apparatus)

comprising means for applying a bias voltage to an electrical signal received on an IC via an external connection, means for a high impedance coupling of the IC external connection to the means for applying the bias voltage, and means for shunting energy due to an ESD event from the IC external connection to an ESD protection circuit via the means for the high impedance coupling.

Example 21 can include subject matter, or can optionally be combined with any portion or combination of any portions of any one or more of Examples 1-20 to include subject matter, that can include means for performing any one or more of the functions of Examples 1-19, or a machine-readable medium including instructions that, when performed by a machine, cause the machine to perform any one or more of the functions of Examples 1-20.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAM's), read only memories (ROM's), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An integrated circuit (IC) comprising:
an external IC connection;
a high impedance circuit;
a biasing circuit communicatively coupled to the external IC connection via the high impedance circuit; and
an electro-static discharge (ESD) protection circuit electrically coupled to the biasing circuit and the high impedance circuit, wherein the external IC connection, the high impedance circuit and ESD protection circuit are connected in series to form a circuit shunt path for the external IC connection via the high impedance circuit to the ESD protection circuit, wherein the ESD protection circuit includes a resistor-capacitor (RC) trigger circuit.

2. The IC of claim 1, wherein the external IC connection is an input connection to receive an electrical input signal, and wherein the biasing circuit includes:
a common mode biasing circuit configured to bias the received electrical input signal to a common mode voltage, and
an output coupled to the external IC connection through the high impedance circuit.

3. The IC of claim 1, wherein a resistance of the high impedance circuit is greater than one giga-ohm.

4. The IC of claim 1, wherein a capacitance of the external IC connection is less than one pico-farad.

5. The IC of claim 1, wherein the high impedance circuit includes a diode circuit configured to conduct current, due to an ESD event at the IC external connection, to the ESD protection circuit.

6. A system comprising:
a microphone circuit; and
an IC, wherein the IC includes:
an external IC connection communicatively coupled to the microphone circuit;
a high impedance circuit;
a biasing circuit communicatively coupled to the external IC connection via the high impedance circuit; and
an electro-static discharge (ESD) protection circuit electrically coupled to the biasing circuit and the high impedance circuit, wherein the external IC connection, the high impedance circuit and the ESD protection circuit are connected in series to form a circuit shunt path for the external IC connection from the high impedance circuit to the ESD protection circuit, wherein the ESD protection circuit includes a resistor-capacitor (RC) trigger circuit.

7. The system of claim 6, wherein the biasing circuit includes a common mode biasing circuit having an output coupled to the external IC connection through the high impedance circuit.

8. The system of claim 6, wherein the microphone circuit is capacitively coupled to the external IC connection.

9. The system of claim 6, wherein a capacitance of the external IC connection is less than one pico-farad.

10. The system of claim 6, wherein a resistance of the high impedance circuit is greater than one giga-ohm.

11. The system of claim 6, wherein the high impedance circuit includes a diode circuit configured to conduct current due to an ESD event at the external IC connection to the ESD protection circuit.

12. The system of claim 6, wherein the system is included in a cellular phone.

13. The system of claim 6, wherein the system is included in a voice recording device.

14. A method of providing ESD protection to an IC external connection, the method comprising:
   communicatively coupling the IC external connection to a biasing circuit via a high impedance circuit;
   communicatively coupling the biasing circuit to an ESD protection circuit; and
   communicatively coupling the IC external connection, the high impedance circuit, and the ESD protection circuit in series to form a circuit shunt path for the external IC connection from the high impedance circuit to the ESD protection circuit, wherein the ESD protection circuit includes a resistor-capacitor (RC) trigger circuit.

15. The method of claim 14, wherein communicatively coupling the IC external connection includes communicatively coupling the IC external connection to an output of a common mode biasing circuit.

16. The method of claim 14, including capacitively coupling the IC external connection to a second device to communicate an electrical signal with the second device.

17. The method of claim 14, including providing an alternating current (AC) coupling to the external connection from a microphone to receive an electrical microphone signal.

18. The method of claim 14, wherein coupling the IC external connection to a high impedance circuit includes coupling the IC external connection to a circuit having an impedance greater than one giga-ohm.

19. The method of claim 14, wherein coupling an IC external input connection to a high impedance circuit includes coupling the IC external connection to a high impedance circuit that includes a diode to conduct current from an ESD event to the ESD protection circuit.

20. An apparatus comprising:
   means for applying a bias voltage to an electrical signal received on an IC via an external connection;
   means for a high impedance coupling of the external IC connection to the means for applying the bias voltage; and
   means for shunting energy due to an ESD event at the external IC connection from the external IC connection via the means for the high impedance coupling to an ESD protection circuit, wherein the means for shunting energy includes a resistor-capacitor (RC) trigger circuit.

* * * * *